United States Patent
Ishii

(10) Patent No.: US 9,070,395 B1
(45) Date of Patent: Jun. 30, 2015

(54) MAGNETIC DISK DEVICE, HEAD AMPLIFIER, AND CONTROLLING METHOD OF MAGNETIC DISK DEVICE

(71) Applicant: Kabushiki Kaisha Toshiba, Minato-ku, Tokyo (JP)

(72) Inventor: Koji Ishii, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/288,708

(22) Filed: May 28, 2014

Related U.S. Application Data

(60) Provisional application No. 61/936,249, filed on Feb. 5, 2014.

(51) Int. Cl.
  *G11B 21/02* (2006.01)
  *G11B 5/596* (2006.01)
  *G11B 5/012* (2006.01)

(52) U.S. Cl.
  CPC ............ *G11B 5/59633* (2013.01); *G11B 5/012* (2013.01)

(58) Field of Classification Search
  None
  See application file for complete search history.

(56) References Cited

U.S. PATENT DOCUMENTS

| | | | |
|---|---|---|---|
| 7,630,162 B2 | 12/2009 | Zhao et al. | |
| 7,804,657 B1 * | 9/2010 | Hogg et al. | 360/66 |
| 7,872,824 B1 * | 1/2011 | Macchioni et al. | 360/66 |
| 8,289,818 B2 | 10/2012 | Taratorin et al. | |
| 2010/0259848 A1 * | 10/2010 | Nanba | 360/75 |
| 2010/0328811 A1 * | 12/2010 | Yun | 360/75 |
| 2014/0268406 A1 * | 9/2014 | Cheng et al. | 360/75 |

FOREIGN PATENT DOCUMENTS

JP  2009-163827 A  7/2009

* cited by examiner

*Primary Examiner* — Tan X Dinh
(74) *Attorney, Agent, or Firm* — Knobbe, Martens, Olson & Bear, LLP

(57) ABSTRACT

According to one embodiment, there is provided a magnetic disk device including a magnetic disk, a magnetic head, a heater, and a control unit. The magnetic head reads out information recorded on the magnetic disk. The heater is configured to adjust a magnetic spacing of the magnetic head from the magnetic disk. The control unit is configured to change a bias amount of the magnetic head according to setting of current flow through the heater.

13 Claims, 13 Drawing Sheets

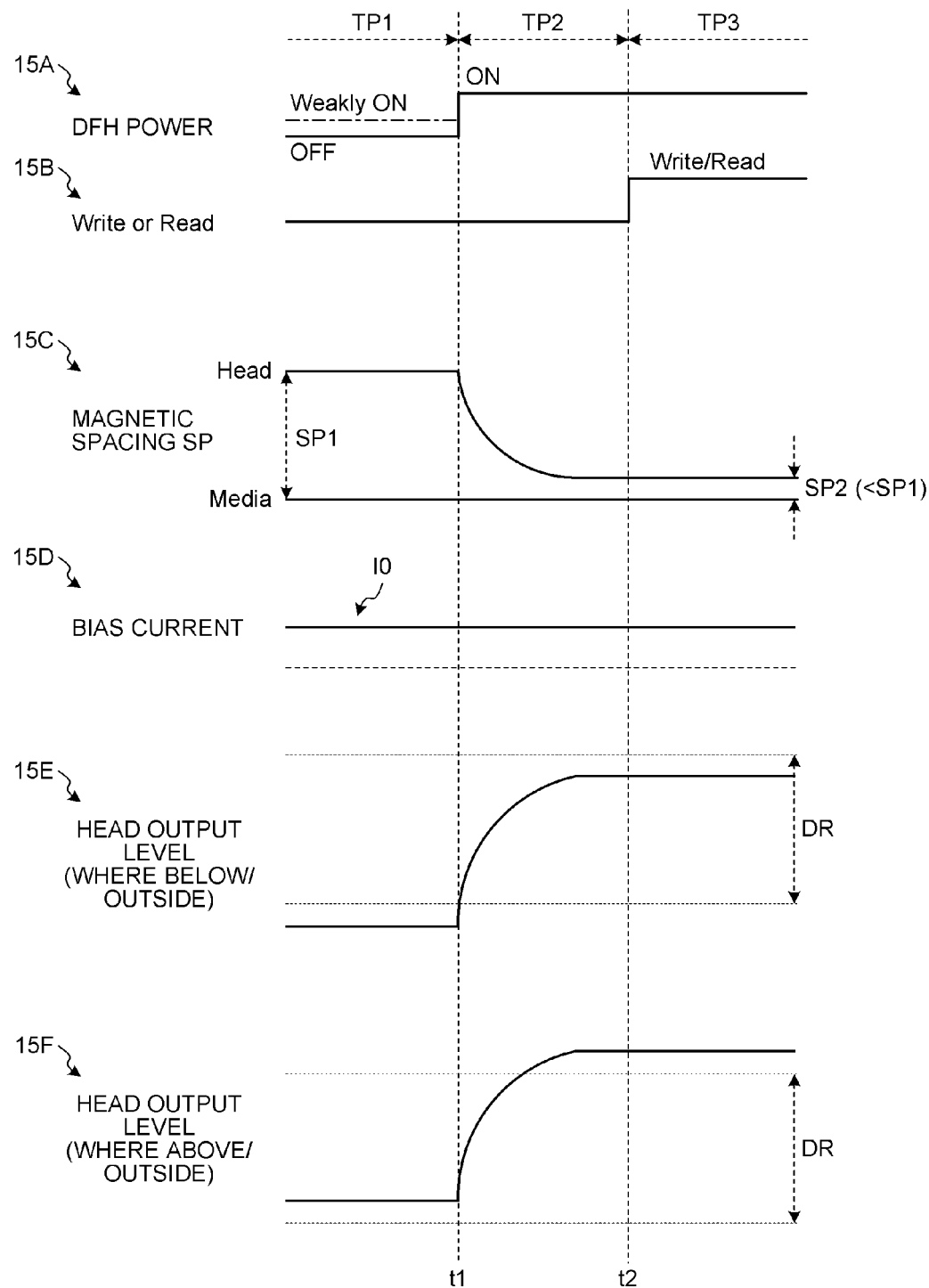

MAGNETIC DISK DEVICE, HEAD AMPLIFIER, AND CONTROLLING METHOD OF MAGNETIC DISK DEVICE

CROSS-REFERENCE TO RELATED APPLICATIONS

This application is based upon and claims the benefit of priority from Provisional Application No. 61/936,249, filed on Feb. 5, 2014; the entire contents of which are incorporated herein by reference.

FIELD

Embodiments described herein relate generally to a magnetic disk device, head amplifier, and controlling method of the magnetic disk device.

BACKGROUND

DFH (Dynamic Flying Height) control may be performed in magnetic disk devices. In the DFH control, by making current flow through a heater mounted on the magnetic head to make the magnetic head thermally expand, the magnetic spacing of the magnetic head from the magnetic disk is adjusted. At this time, it is desired to improve the error rate of information read out by the magnetic head.

BRIEF DESCRIPTION OF THE DRAWINGS

FIG. 15 is a diagram showing DFH control in basic form.

DETAILED DESCRIPTION

In general, according to one embodiment, there is provided a magnetic disk device including a magnetic disk, a magnetic head, a heater, and a control unit. The magnetic head reads out information recorded on the magnetic disk. The heater is configured to adjust a magnetic spacing of the magnetic head from the magnetic disk. The control unit is configured to change a bias amount of the magnetic head according to setting of current flow through the heater.

Exemplary embodiments of a magnetic disk device will be explained below in detail with reference to the accompanying drawings. The present invention is not limited to the following embodiments.

First Embodiment

Figure 1:
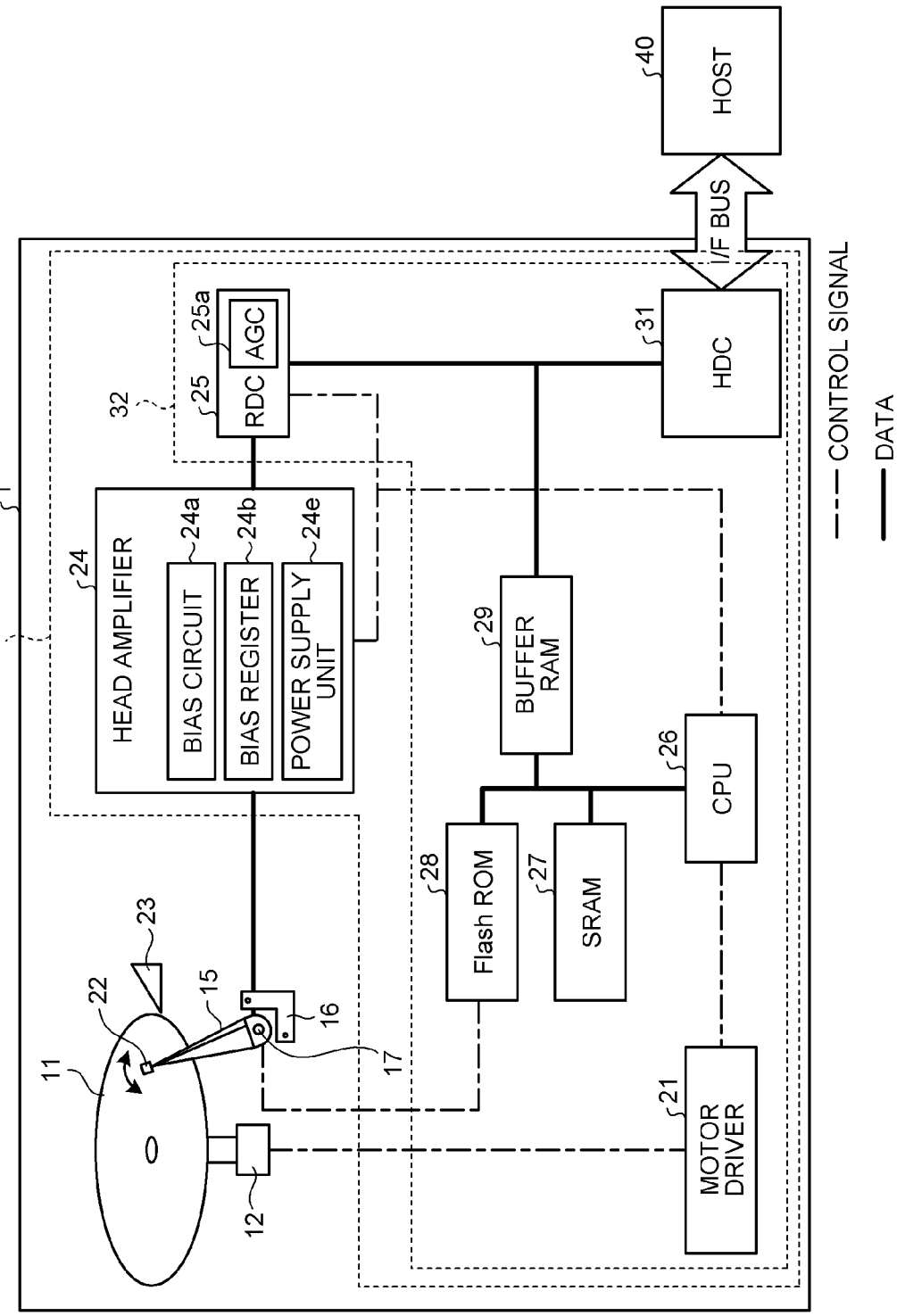
FIG. 1 is a diagram showing configuration of a magnetic disk device according to a first embodiment.

The magnetic disk device according to the first embodiment will be described using FIG. 1. FIG. 1 is a diagram showing the configuration of the magnetic disk device 1.

The magnetic disk device 1 is, for example, a hard disk drive and functions as an external storage device for a host 40.

Specifically, the magnetic disk device 1 comprises a magnetic disk 11, a spindle motor 12, a magnetic head 22, an actuator arm 15, a voice coil motor (VCM) 16, a ramp 23, and a control unit 33. These constituents are placed within a housing (not shown).

The control unit 33 has a head amplifier 24 and a controller 32. The head amplifier 24 has a bias circuit 24a, a bias register 24b, and a power supply unit 24e. The controller 32 has a motor driver 21, a read write channel (RDC) 25, a hard disk controller (HDC) 31, a CPU 26, an SRAM 27, a flash ROM 28, and a buffer RAM 29.

The magnetic disk 11 is a disk-shaped recording medium on which to record a variety of information and is rotationally driven by a spindle motor 12. The magnetic disk 11 has multiple tracks in a concentric-circle shape with a point near the rotational center of the spindle motor 12 as their center. In each track, data areas DT and servo areas SV are alternately provided (see FIG. 8).

The actuator arm 15 is pivotally attached to a pivot 17. The magnetic head 22 is attached to one end of the actuator arm 15. The VCM 16 is connected to the other end of the actuator arm 15. The VCM 16 rotates the actuator arm 15 around the pivot 17 to position the magnetic head 22, in a lifted state, over an arbitrary radius location of the magnetic disk 11. At this time, the CPU 26 performs servo control (positioning control) to position the magnetic head 22 using a servo signal (servo information) read from the servo areas SV (see FIG. 8) by the magnetic head 22.

The motor driver 21, according to a command from the CPU 26, drives the spindle motor 12 to rotate the magnetic disk 11 at a predetermined rotational speed around the rotation axis. Further, the motor driver 21, according to a command from the CPU 26, drives the VCM 16 to move the magnetic head 22 at the end of the actuator arm 15 in a radius direction of the magnetic disk 11.

Figure 2:
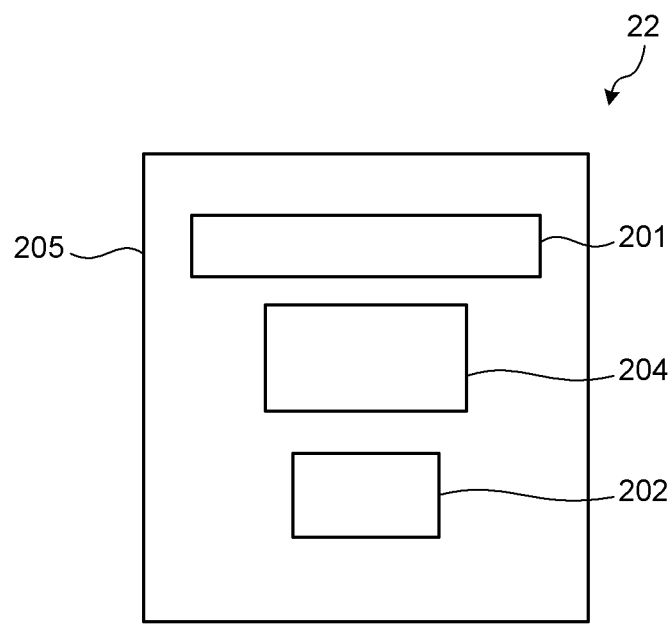
FIG. 2 is a diagram showing configuration of a magnetic head in the first embodiment.
Figure 3:
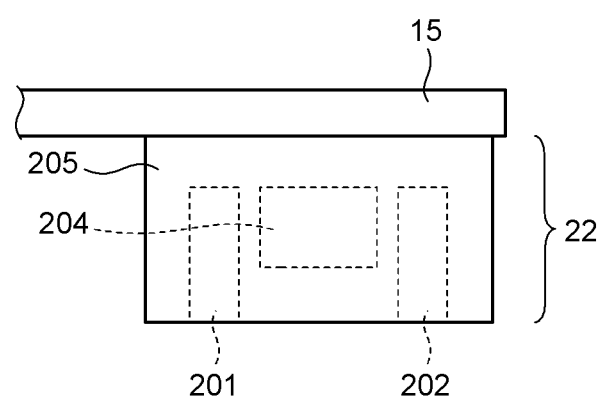
FIG. 3 is a diagram showing configuration of the magnetic head in the first embodiment.

The magnetic head 22 writes data onto the magnetic disk 11 and reads information (data and servo information) recorded on the magnetic disk 11. The magnetic head 22 has, e.g., the configuration shown in FIGS. 2 and 3. FIG. 2 shows the configuration of the magnetic head 22 seen from the recording surface side of the magnetic disk 11, and FIG. 3 shows the configuration of the magnetic head 22 seen from the outer edge side of the magnetic disk 11.

The magnetic head 22 is configured to include a slider 205, a recording head 201, a reproducing head (MR head) 202, and a heater 204.

The recording head 201 writes data onto data areas of the magnetic disk 11 by the magnetic field generated from its magnetic poles. The reproducing head 202 reads change in the magnetic field on the magnetic disk 11 as data, thereby reading information (data and servo information) recorded on the magnetic disk 11. Note that when the rotation of the magnetic disk 11 is stopped, and so on, the magnetic head 22 is evacuated onto the ramp 23 (see FIG. 1).

The heater 204 receives power supply from the power supply unit 24e via the bias circuit 24a to heat the slider 205 of the magnetic head 22. By this heating, the slider 205 is deformed thermally, and thus the magnetic spacing SP of the magnetic head 22 from the magnetic disk 11 varies.

At read processing, the head amplifier 24 amplifies the signal (read signal) read by the reproducing head 202 from the magnetic disk 11 to output to the RDC 25. At this time, the CPU 26 performs control for bias current to flow from the power supply unit 24e via the bias circuit 24a to the reproducing head 202. The RDC 25 further amplifies the signal from the head amplifier 24. The RDC 25 has an AGC circuit 25a and performs AGC (Auto Gain Control) control using the AGC circuit 25a to amplify the signal such that the signal level thereof becomes a predetermined target value.

At write processing, the head amplifier 24 amplifies a write signal supplied from the RDC 25 to output to the recording head 201.

In the magnetic disk device 1, at read processing and write processing, DFH (Dynamic Flying Height) control may be performed. In the DFH control, the CPU 26 performs control to supply power from the power supply unit 24e via the bias circuit 24a to the heater 204. That is, the CPU 26 makes DFH power flow through the heater 204 mounted on the magnetic head 22 from the power supply unit 24e via the bias circuit 24a to make the magnetic head 22 thermally expand. By this means, the magnetic spacing SP of the magnetic head 22 from the magnetic disk 11 can be adjusted.

Figure 4:
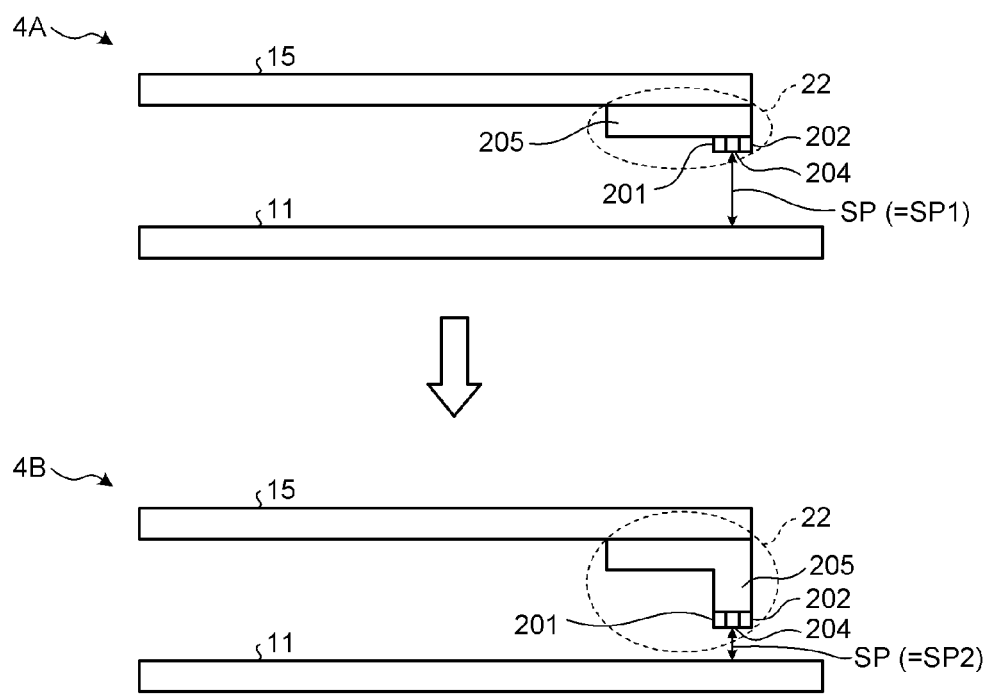
FIG. 4 is a diagram showing DFH (Dynamic Flying Height) control in the first embodiment.

For example, the magnetic disk device 1 performs control as shown in FIG. 4. FIG. 4 is a schematic diagram for explaining the DFH control. In the magnetic head 22, the heater 204 is mounted between the recording head 201 and the reproducing head 202. The CPU 26 transmits a power supply command to the power supply unit 24e, and the power supply unit 24e having received this supplies power via the bias circuit 24a to the heater 204 to heat the heater 204. By this heating, as shown in 4A to 4B of FIG. 4, the slider 205 of the magnetic head 22 is thermally deformed, and thus the magnetic spacing SP of the recording head 201 and reproducing head 202 from the magnetic disk 11 can be changed from SP1 to SP2 (<SP1).

At write processing, as the magnetic spacing SP of the recording head 201 from the magnetic disk 11 is reduced, magnetic flux from the recording head 201 acts on the magnetic disk 11 more strongly, and hence the write characteristic can be improved, and thus the error rate of written data can be improved, and high surface density onto the magnetic disk 11 can be achieved.

At read processing, as the magnetic spacing SP of the reproducing head 202 from the magnetic disk 11 is reduced, magnetic force of the magnetic disk 11 acts on the reproducing head 202 more strongly, and hence the read characteristic can be improved, and thus the error rate of data and servo information at read processing can be improved, and high surface density onto the magnetic disk 11 can be achieved. The magnetic spacing SP controlled by the DFH control is sometimes called back off.

Consider the case where the bias current of the reproducing head 202 in the magnetic head 22 is kept at a constant value I0 all the time as shown in 15D of FIG. 15. FIG. 15 is a diagram showing the DFH control in the basic form.

When switching recording tracks, by making current flow through the VCM 16, seek operation is performed by the actuator arm 15 having the magnetic head 22 mounted thereon. During the seek, the magnetic spacing SP of the magnetic head 22 from the magnetic disk 11 may fluctuate because of wind disturbance due to a side wind that the actuator arm 15 receives or the like. During the seek, in order to avoid collision of the magnetic head 22 and the magnetic disk 11, the DFH power flow through the heater 204 is turned off (the DFH control is OFF) as in time period TP1 shown in 15A of FIG. 15. Or, weaker DFH power than in a back-off state (time periods TP2, TP3) is made to flow through the heater 204 as indicated by the dot-dashed line in 15A of FIG. 15 (the DFH control is weakly ON).

That is, during the seek (time period TP1 preceding timing t1), the DFH power is smaller than when being on track, writing or reading (time period TP3 subsequent to timing t2) as shown in 15A of FIG. 15. Thus, the magnetic spacing SP1 in the seek (time period TP1) is larger than the magnetic spacing SP2 when writing/reading (time period TP3) (see 15C of FIG. 15). Hence, the output level of the reproducing head 202 in the seek (time period TP1) is smaller than the output level of the reproducing head 202 when writing/reading (time period TP3) (see 15E of FIG. 15).

That is, where the bias current of the reproducing head 202 is kept at the constant value I0 all the time, the output level of the reproducing head 202 in the seek (time period TP1) and the output level of the reproducing head 202 when writing/reading (time period TP3) may be greatly different.

The servo areas SV (see FIG. 8) are placed on the magnetic disk 11 at similar BPI (Bit Per Inch) for outer-side tracks and inner-side tracks. Thus, the output resolution of the reproducing head 202 is different between the outer-side tracks and inner-side tracks, and thus the output level of the reproducing head 202 may be different between the inner side and the outer side.

For the data areas DT (see FIG. 8) between the servo areas SV, there is usually used zone bit recording that partitions the magnetic disk 11 into a number of zones according to the radius location to change the transfer rate for each zone thereby making the BPI (Bit Per Inch) even across the surface substantially equal. Thus, the output resolution of the data area DT is not greatly different between the outer-side tracks and inner-side tracks. However, even in this case, the output level of the reproducing head 202 may vary depending on the characteristic of the magnetic head 22 (individual difference).

That is, in the situation where at read processing of data and servo information, the output level of the servo signal of the reproducing head 202 is likely to be greatly different according to ON/OFF of the DFH control, the error rates of the data signal and servo signal need to be kept lower than a required level. That is, in order that the HDC 31 performs error correction appropriately using the signals output from the RDC 25 to keep the error rates lower than the required level, the AGC control needs to be appropriately performed by the AGC circuit 25a in the RDC 25 receiving the output of the reproducing head 202 of the magnetic head 22. That is, the output level of the reproducing head 202 of the magnetic head 22 needs to be within the input dynamic range DR of the AGC circuit 25a.

When the DFH control to make the magnetic spacing (back-off amount) SP smaller is performed to improve surface density, the output level of the reproducing head 202 may be greatly different between when the DFH control is OFF (time period TP1) and when the DFH control is ON (time period TP3). If the output level of the reproducing head 202 is greatly different between when the DFH control is OFF (time period TP1) and when ON (time period TP3), then the output level of the reproducing head 202 may deviate below from the input dynamic range DR of the AGC circuit 25a when the DFH control is OFF (time period TP1) as shown in 15E of FIG. 15. Hence, the AGC control is not appropriately performed by the AGC circuit 25a, and thus the error rate of the servo signal may deteriorate. Or, as shown in, e.g., 15F of FIG. 15, the output level of the reproducing head 202 may deviate above from the input dynamic range DR of the AGC circuit 25a when the DFH control is ON (time period TP3). Hence, the AGC control is not appropriately performed by the AGC circuit 25a, and thus the error rate of the data signal may deteriorate.

As such, when the output level of the reproducing head 202 deviates from the input dynamic range DR of the AGC circuit 25a, this increases the possibility that the AGC control is not appropriately performed by the AGC circuit 25a, and thus it can become difficult to improve the error rates of the data signal and servo signal, resulting in high possibility that improvement in surface density may be hampered.

Therefore, the present embodiment is aiming at making the output level of the reproducing head 202 be within the input dynamic range DR of the AGC circuit 25a by changing the bias current of the reproducing head 202 according to the ON/OFF setting of the DFH control.

Figure 5:
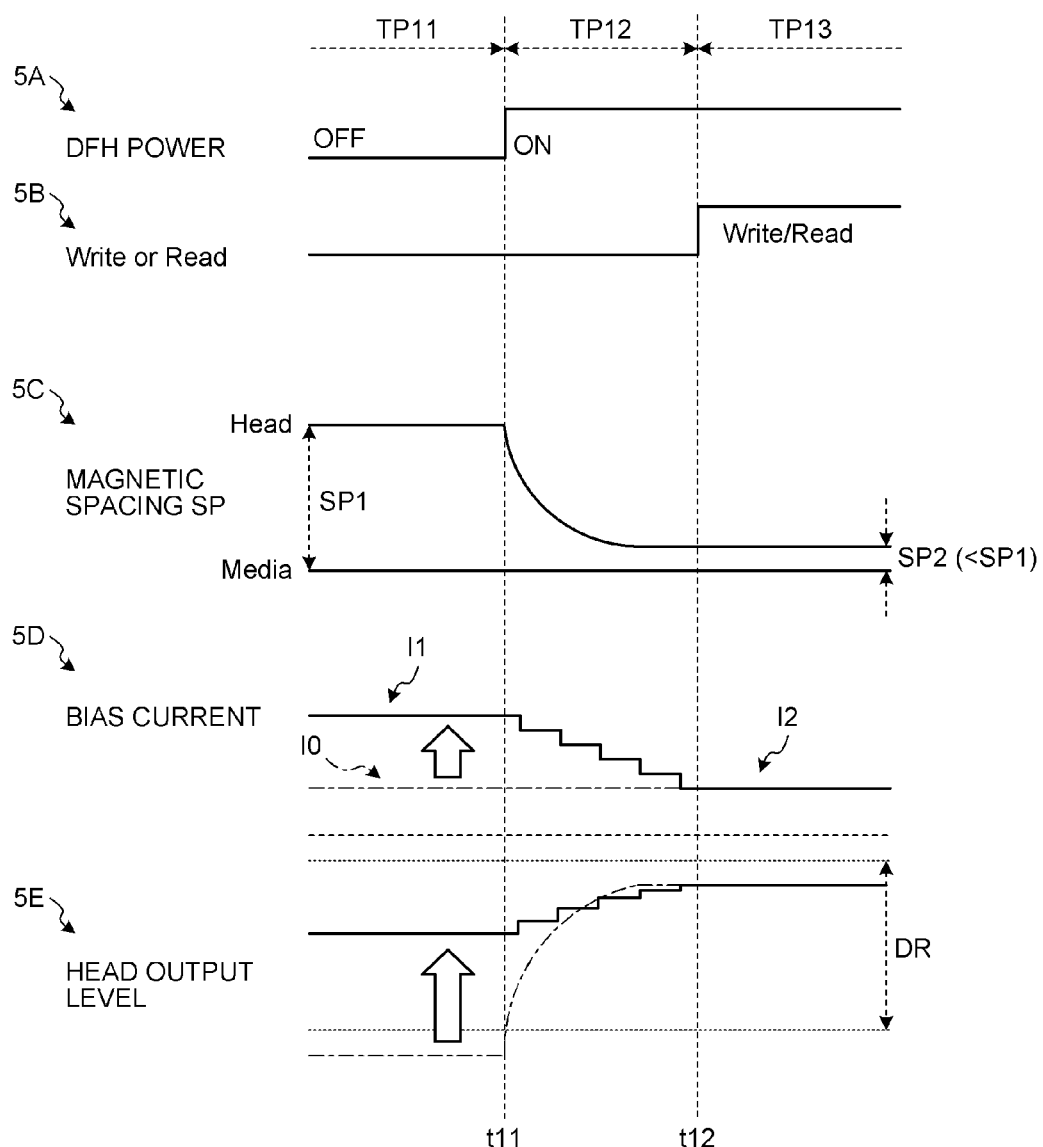
FIG. 5 is a diagram showing control of bias current in the first embodiment.
Figure 6:
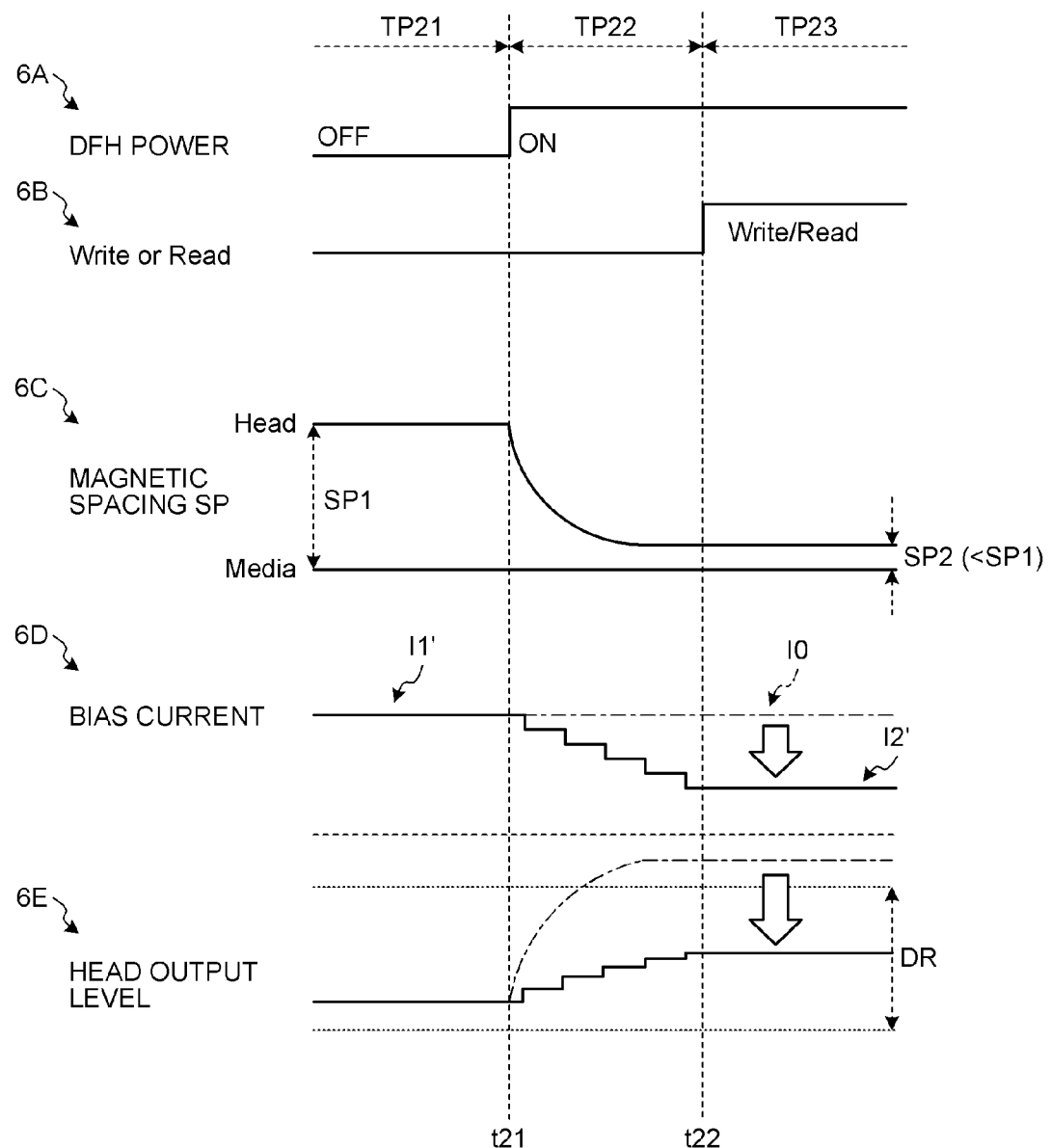
FIG. 6 is a diagram showing control of bias current in the first embodiment.

Specifically, the control unit 33 changes the bias current of the magnetic head 22 following ON of the DFH control as shown in FIGS. 5 and 6. FIGS. 5 and 6 are diagrams showing the control of the bias current of the reproducing head 202.

The control unit 33, in response to the DFH power flow through the heater 204 being turned on, changes the bias current of the magnetic head 22 so that the output level of the magnetic head 22 comes within a predetermined range, that is, the input dynamic range DR of the AGC circuit 25a. The control unit 33, in response to the DFH power flow through the heater 204 being turned on, changes the bias current of the magnetic head 22 from a value I1 to a value I2. The value I1 is greater than the value I2. By changing the bias current of the magnetic head 22 (reproducing head 202) between when the DFH control is OFF and when the DFH control is ON, the difference in the output level of the magnetic head 22 can be made smaller. Also, the output level of the magnetic head 22 can be made to come within the input dynamic range of the AGC circuit 25a, thus achieving low back off.

For example, where it is understood from an experiment beforehand that if control of the basic form to keep the bias current constant all the time (see 15D of FIG. 15) is performed, the output level of the reproducing head 202 will deviate below from the input dynamic range DR of the AGC circuit 25a (see 15E of FIG. 15), the control unit 33 performs control of the bias current as shown in FIG. 5.

During time period TP11 preceding timing t11, the DFH power flow through the heater 204 is turned off by the control unit 33. In parallel with this, the controller 32 controls the bias current of the magnetic head 22 to be at the value I1. The value I1 is adjusted to be at a value greater than the value I2 (≈I0) so that the output level of the magnetic head 22 (the reproducing head 202) is within the input dynamic range DR of the AGC circuit 25a (see 5D of FIG. 5).

At this time, since the DFH power flow through the heater 204 is off, the magnetic spacing SP of the magnetic head 22 from the magnetic disk 11 is at the large value SP1, but the bias current is controlled to be at the large value I1 corresponding to it. Thus, the output level of the magnetic head 22 (the reproducing head 202) can be within the input dynamic range DR of the AGC circuit 25a as shown in 5E of FIG. 5.

When at timing t11 the control unit 33 turns on the DFH power flow through the heater 204, the magnetic spacing SP of the magnetic head 22 from the magnetic disk 11 starts decreasing from the value SP1. The control unit 33 starts accordingly decreasing the bias current of the magnetic head 22.

That is, during time period TP12 from timing t11 to timing t12, the magnetic spacing SP of the magnetic head 22 from the magnetic disk 11 gradually decreases from the value SP1 to the value SP2. The control unit 33 accordingly changes the bias current of the magnetic head 22 from the value I1 to the value I2 in a stepwise manner. The value I2 may be substantially equal to the value I0 in the basic form (see 15D of FIG. 15).

At timing t12, the magnetic spacing SP is at the value SP2 while the control unit 33 is controlling the bias current of the magnetic head 22 to be at the value I2. Accordingly, the control unit 33 starts write processing of data or read processing of information (data, servo).

During time period TP13 subsequent to timing t12, the control unit 33 keeps the bias current of the magnetic head 22 to be at the value I2. In this state, the control unit 33 performs write processing of data or read processing of information (data, servo).

Or, for example, where it is understood from an experiment beforehand that if control of the basic form to keep the bias current constant all the time (see 15D of FIG. 15) is performed, the output level of the reproducing head 202 will deviate above from the input dynamic range DR of the AGC circuit 25a (see 15F of FIG. 15), the control unit 33 performs control of the bias current as shown in FIG. 6. The control of the bias current as shown in FIG. 6 is basically similar to control of the bias current as shown in FIG. 5, but differs in the following points.

During time period TP21 preceding timing t21, the control unit 33 controls the bias current of the magnetic head 22 to be at the value I1'. The value I1' may be substantially equal to the value I0 in the basic form (see 15D of FIG. 15).

During time period TP22 from timing t21 to timing t22, the control unit 33 changes the bias current of the magnetic head 22 from the value I1' to the value I2' in a stepwise manner. During time period TP23 subsequent to timing t22, the controller 32 keeps the bias current of the magnetic head 22 to be at the value I2'. The value I2' is adjusted to be at a value smaller than the value I1' (≈I0) so that the output level of the magnetic head 22 (the reproducing head 202) is within the input dynamic range DR of the AGC circuit 25a (see 6D of FIG. 6).

At this time, since the DFH power flow through the heater 204 is on, the magnetic spacing SP of the magnetic head 22 from the magnetic disk 11 is at the small value SP2, but the bias current is controlled to be at the small value I2' corresponding to it. Thus, the output level of the magnetic head 22 (the reproducing head 202) can be within the input dynamic range DR of the AGC circuit 25a as shown in 6E of FIG. 6.

Figure 7:
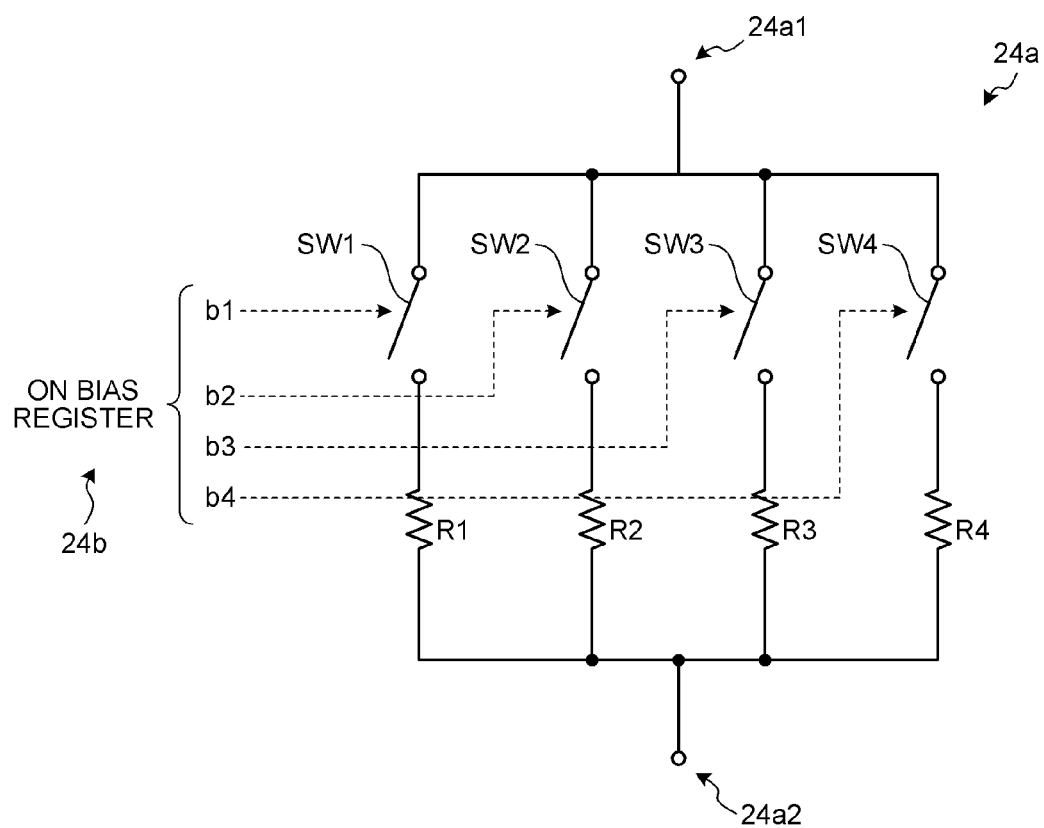
FIG. 7 is a diagram showing configuration of a bias circuit in the first embodiment.

Next, the configuration and operation of the head amplifier 24 will be described using FIGS. 1 and 7. FIG. 7 is a diagram showing the configuration of the head amplifier 24.

The head amplifier 24 has the bias circuit 24a, the bias register 24b, and the power supply unit 24e as shown in FIG. 1. The bias register 24b holds a control value for the bias current. The bias circuit 24a generates the bias current using electric power from the power supply unit 24e according to the control value held in the bias register 24b. The control value held in the bias register 24b is a digital value having multiple bits b1 to b4.

For example, the bias circuit 24a has multiple switches SW1 to SW4 and multiple resistors R1 to R4 as shown in FIG. 7. In the bias circuit 24a, multiple sets of switch SW1 to SW4 and resistor R1 to R4 respectively connected serially are connected in parallel between an input terminal 24a1 and an output terminal 24a2. The multiple switches SW1 to SW4 correspond to the multiple resistors R1 to R4 and correspond to the multiple bits b1 to b4 of the control value of the bias register 24b.

Each switch SW1 to SW4 can switch between the corresponding resistor R1 to R4 being connected between the input terminal 24a1 and the output terminal 24a2 and the corresponding resistor R1 to R4 not being connected according to the corresponding bit b1 to b4. When the corresponding bit b1 to b4 is active (e.g., 1), each switch SW1 to SW4 is turned on, so that the corresponding resistor R1 to R4 is electrically inserted between the input terminal 24a1 and the output terminal 24a2. When the corresponding bit b1 to b4 is nonactive (e.g., 0), each switch SW1 to SW4 is turned off, so that the corresponding resistor R1 to R4 is electrically separated from between the input terminal 24a1 and the output terminal 24a2.

The resistors R1 to R4 can be configured to have different resistances respectively. The conductance values (reciprocals of the resistances) of the resistors R1 to R4 can be set to satisfy the following expression 1.

$$1/(R1):1/(R2):1/(R3):1/(R4)=\sigma:2\sigma:4\sigma:8\sigma \qquad \text{Expression 1}$$

By setting them to satisfy the expression 1, the combined conductance value of the bias circuit 24a can be varied by units of conductance value σ according to the bits b1 to b4, so that the bias current can be varied by units corresponding to the conductance value σ. For example, during time period TP12 shown in FIG. 5 and time period TP22 shown in FIG. 6, the controller 32 (CPU 26) can access the bias register 24b to rewrite the control value therein, thereby changing the bias current of the magnetic head 22 from the value I1 (I1') to the value I2 (I2') in a stepwise manner by units corresponding to the conductance value σ.

Figure 9:
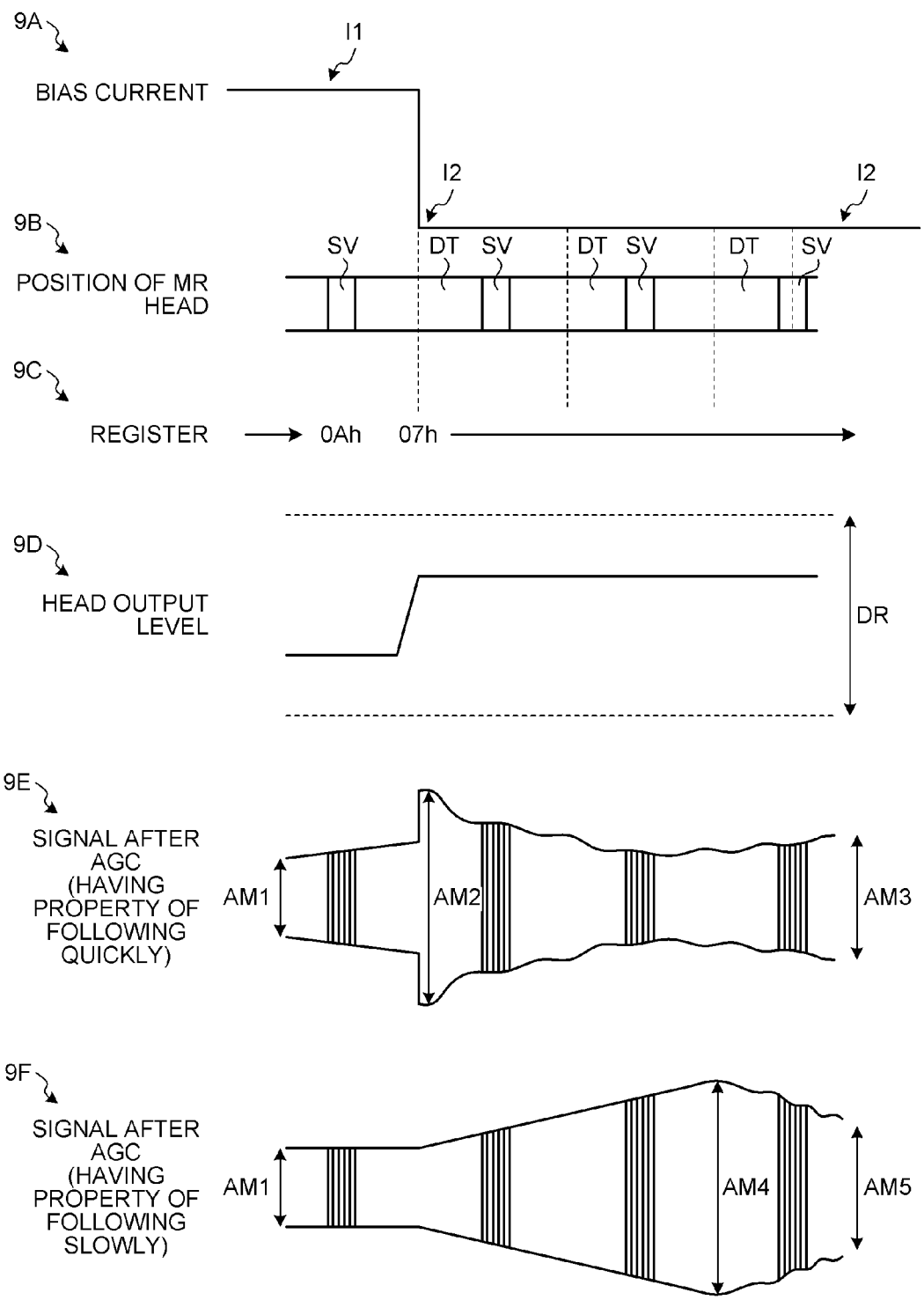
FIG. 9 is a diagram showing control where bias current is suddenly changed.

Here, consider the case where the controller 32 changes the bias current of the magnetic head 22 sharply in binary in response to the current flow through the heater 204 being turned on as shown in 9A of FIG. 9. FIG. 9 is a diagram showing control where the bias current is sharply changed. In this case, the output level of the magnetic head 22 (the reproducing head 202) changes sharply in binary as shown in 9D of FIG. 9. Hence, the signal after AGC by the AGC circuit 25a changes as shown in 9E of FIG. 9, and thus the AGC control may become unstable. The amplitude of the signal after AGC may increase from amplitude AM1 to amplitude AM2 and then decrease to amplitude AM3. Or, as shown in 9F of FIG. 9, the AGC control does not follow immediately, but tries to catch up, and may become unstable. The amplitude of the signal after AGC may increase from amplitude AM1 to amplitude AM4 and then decrease to amplitude AM5. If the AGC control becomes unstable, seek control may also be affected.

Figure 8:
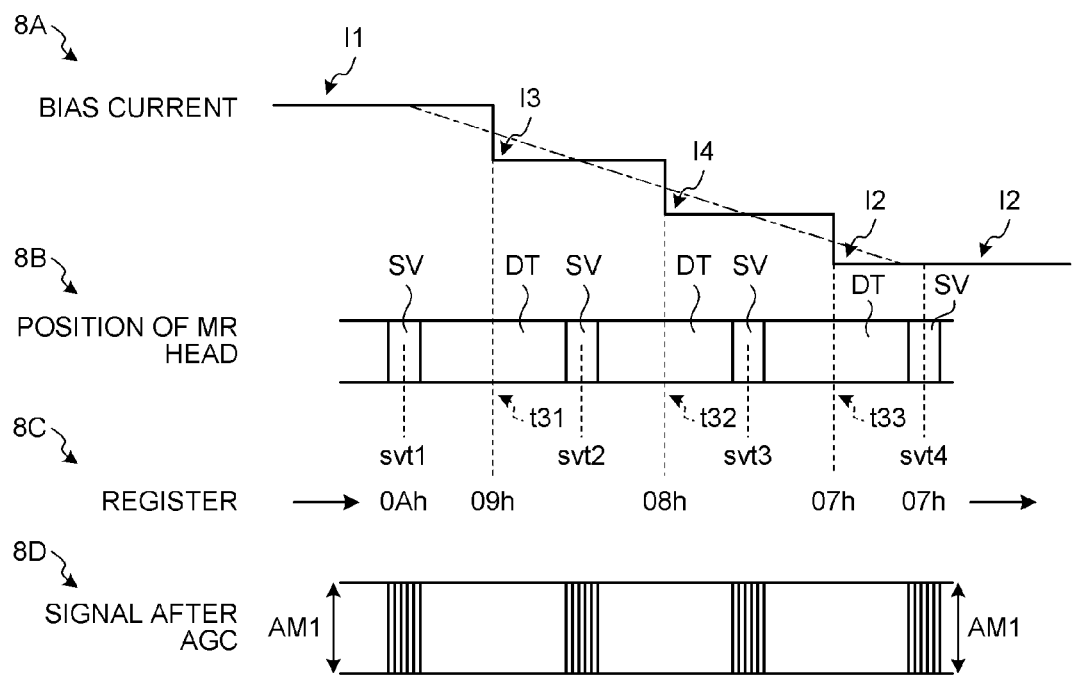
FIG. 8 is a diagram showing control of bias current in the first embodiment.

In contrast, in the present embodiment, the controller 32 (CPU 26) can access the bias register 24b to rewrite the control value therein as shown in FIG. 8, thereby changing the bias current of the magnetic head 22 from the value I1 to the value I2 in a stepwise manner by units corresponding to the conductance value σ.

For example, during the time period preceding timing t31 between servo timing svt1 and servo timing svt2 shown in FIG. 8, the control value of the bias register 24b is set at 0Ah. At this time, when (b1, b2, b3, b4), shown in FIG. 7, =(0, 1, 0, 1), the resistors R2, R4 are selectively inserted between the input terminal 24a1 and the output terminal 24a2 in the bias circuit 24a, so that the combined conductance becomes 10σ. Accordingly the bias circuit 24a supplies the bias current of the value I1 to the magnetic head 22.

At timing t31 shown in FIG. 8, the controller 32 rewrites the control value of the bias register 24b to be at 09h. At this time, when (b1, b2, b3, b4), shown in FIG. 7, =(1, 0, 0, 1), the resistors R1, R4 are selectively inserted between the input terminal 24a1 and the output terminal 24a2 in the bias circuit 24a, so that the combined conductance becomes 9σ. Accordingly the bias circuit 24a supplies the bias current of a value I3 (<I1) to the magnetic head 22.

At timing t32 between servo timing svt2 and servo timing svt3 shown in FIG. 8, the controller 32 rewrites the control value of the bias register 24b to be at 08h. At this time, when (b1, b2, b3, b4), shown in FIG. 7, =(0, 0, 0, 1), the resistor R4 is selectively inserted between the input terminal 24a1 and the output terminal 24a2 in the bias circuit 24a, so that the combined conductance becomes 8σ. Accordingly the bias circuit 24a supplies the bias current of a value I4 (<I3) to the magnetic head 22.

At timing t33 between servo timing svt3 and servo timing svt4 shown in FIG. 8, the controller 32 rewrites the control value of the bias register 24b to be at 07h. At this time, when (b1, b2, b3, b4), shown in FIG. 7, =(1, 1, 1, 0), the resistors R1, R2, R3 are selectively inserted between the input terminal 24a1 and the output terminal 24a2 in the bias circuit 24a, so that the combined conductance becomes 7σ. Accordingly the bias circuit 24a supplies the bias current of the value I2 (<I4) to the magnetic head 22.

As such, bias setting is performed between servo areas SV during the seek, thereby changing the bias current in a stepwise manner, and hence the output (servo output) of the magnetic head 22 can be changed in a stepwise manner. By this means, the bias current can be approximately linearly changed from the value I1 to the value I2 as indicated by the dot-dashed line in 8A of FIG. 8. As a result, the AGC control by the AGC circuit 25a can be caused to easily follow the output of the magnetic head 22 as shown in 8D of FIG. 8, and thus the amplitude of the signal after AGC can be stably kept at amplitude AM1, resulting in the AGC control being stabilized and the seek control being stabilized.

It should be noted that, although FIG. 8 illustratively shows the case where the bias current is changed in four steps (taking on four values), the number of steps in which the bias current is changed may be increased. By increasing the number of steps in which the bias current is changed, change in the bias current can be made further close to linear change.

As described above, in the first embodiment, in the magnetic disk device 1, the control unit 33 changes the bias current of the magnetic head 22 according to the setting for the current flow through the heater 204. Specifically, the control unit 33, in response to the current flow through the heater 204 being turned on, changes the bias current of the magnetic head 22 from the value I1 to the value I2 (<I1). Thus, the output level of the magnetic head 22 (the reproducing head 202) can be within the input dynamic range DR of the AGC circuit 25a, and hence the AGC control can be easily performed by the AGC circuit 25a. As a result, the error rates of the data signal and servo signal can be improved, and hence the surface density of recording onto the magnetic disk 11 can be improved.

Further, in the first embodiment, in the magnetic disk device 1, the control unit 33, in response to the current flow through the heater 204 being turned on, changes the bias current of the magnetic head 22 in a stepwise manner from the value I1 to the value I2 (<I1). Thus, the bias current can be approximately linearly changed from the value I1 to the value I2, and hence the AGC control by the AGC circuit 25a can be caused to easily follow the output of the magnetic head 22, and thus the amplitude of the signal after AGC can be stably kept at amplitude AM1. As a result, the AGC control by the AGC circuit 25*a* can be stabilized, and the seek control by the CPU 26 can be stabilized.

Yet further, in the first embodiment, in the control unit 33 of the magnetic disk device 1, the controller 32, correspondingly to the current flow through the heater 204 being off, sets the control value of the bias register 24*b* at a first control value (control value 0Ah). The control unit 33, correspondingly to the current flow through the heater 204 being on, sets the control value in the bias register 24*b* at a second control value (control value 07h) corresponding to a smaller bias current value than the first control value. Thus, the bias current of the magnetic head 22 can be changed from the value I1 to the value I2 (<I1).

Still further, in the first embodiment, in the control unit 33 of the magnetic disk device 1, the controller 32, in response to the current flow through the heater 204 being turned on, sets the control value of the bias register 24*b* to change in a stepwise manner from the first control value to the second control value. For example, the controller 32, at timings between servo timings svt1 to svt4, which pass during the time from when the current flow through the heater 204 is turned on until the magnetic spacing SP of the magnetic head 22 becomes stable, sets the control value of the bias register 24*b* to change in a stepwise manner from the first control value to the second control value. Thus, the bias current of the magnetic head 22 can be changed in a stepwise manner from the value I1 to the value I2 (<I1).

It should be noted that, although FIGS. 2 to 4 illustratively show the case where the heater 204 is provided in the slider 205 of the magnetic head 22, the heater 204 may be provided outside the slider 205 as long as the configuration is made such that the slider 205 can be thermally deformed so that the magnetic spacing SP of the recording head 201 from the magnetic disk 11 becomes smaller.

Alternatively, although FIG. 8 illustratively shows the case where the bias current of the magnetic head 22 is changed by substantially the same variation amount when being changed in a stepwise manner from the value I1 to the value I2 (<I1), the bias current may be changed by a gradually decreasing variation amount in a stepwise manner from the value I1 to the value I2 (<I1). This will be explained using FIG. 10.

Figure 10:
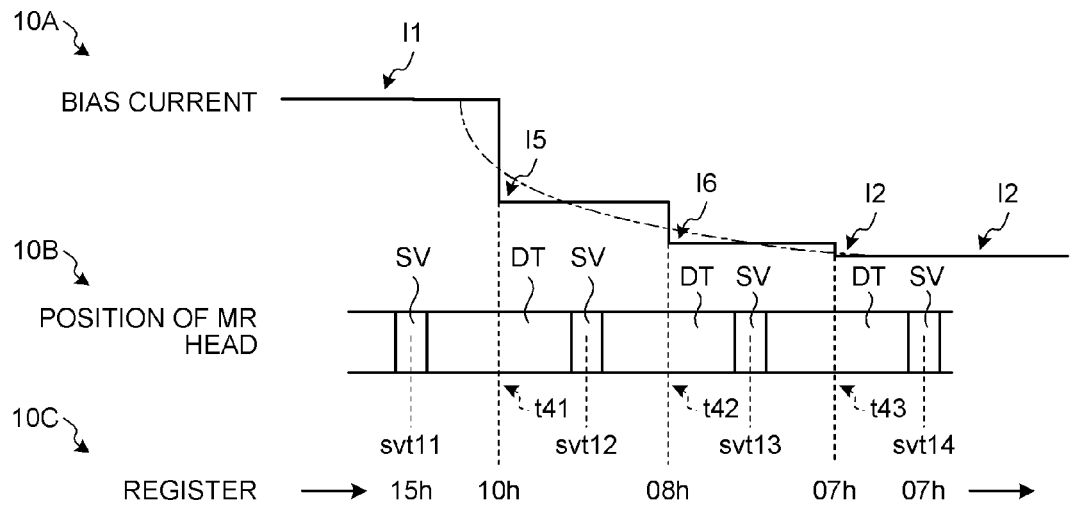
FIG. 10 is a diagram showing control of bias current in a modified example of the first embodiment.

For example, during the time period preceding timing t41 between servo timing svt11 and servo timing svt12 shown in FIG. 10, the control value of the bias register 24*b* is set at 15h. At this time, when (b1, b2, b3, b4), shown in FIG. 7, =(1, 1, 1, 1), the resistors R1, R2, R3, R4 are inserted between the input terminal 24*a*1 and the output terminal 24*a*2 in the bias circuit 24*a*, so that the combined conductance becomes 15σ. Accordingly the bias circuit 24*a* supplies the bias current of the value I1 to the magnetic head 22.

At timing t41 shown in FIG. 10, the controller 32 rewrites the control value of the bias register 24*b* to be at 10h. At this time, when (b1, b2, b3, b4), shown in FIG. 7, =(0, 1, 0, 1), the resistors R2, R4 are selectively inserted between the input terminal 24*a*1 and the output terminal 24*a*2 in the bias circuit 24*a*, so that the combined conductance becomes 10σ. Accordingly the bias circuit 24*a* supplies the bias current of a value I5 (<I1) to the magnetic head 22.

At timing t42 between servo timing svt12 and servo timing svt13 shown in FIG. 10, the controller 32 rewrites the control value of the bias register 24*b* to be at 08h. At this time, when (b1, b2, b3, b4), shown in FIG. 7, =(0, 0, 0, 1), the resistor R4 is selectively inserted between the input terminal 24*a*1 and the output terminal 24*a*2 in the bias circuit 24*a*, so that the combined conductance becomes 8σ. Accordingly the bias circuit 24*a* supplies the bias current of a value I6 (<I5) to the magnetic head 22. At this time, the following expression 2 holds.

$$|I6-I5|<|I5-I1| \qquad \text{Expression 2}$$

At timing t43 between servo timing svt13 and servo timing svt14 shown in FIG. 10, the controller 32 rewrites the control value of the bias register 24*b* to be at 07h. At this time, when (b1, b2, b3, b4), shown in FIG. 7, =(1, 1, 1, 0), the resistors R1, R2, R3 are selectively inserted between the input terminal 24*a*1 and the output terminal 24*a*2 in the bias circuit 24*a*, so that the combined conductance becomes 7σ. Accordingly the bias circuit 24*a* supplies the bias current of the value I2 (<I6) to the magnetic head 22. At this time, the following expression 3 holds.

$$|I2-I6|<|I6-I5| \qquad \text{Expression 3}$$

As such, bias setting is performed between servo areas SV during the seek, thereby changing the bias current in a stepwise manner by a gradually decreasing variation amount, and hence the output (servo output) of the magnetic head 22 can be changed in a stepwise manner by a gradually decreasing variation amount. By this means, the bias current can be changed from the value I1 to the value I2 approximately along with a characteristic corresponding to the change characteristic of the magnetic spacing SP as indicated by the dot-dashed line in 10A of FIG. 10. As a result, the AGC control by the AGC circuit 25*a* can be caused to further easily follow the output of the magnetic head 22, and thus the amplitude of the signal after AGC can be stably kept at amplitude AM1, resulting in the AGC control being further stabilized.

Alternatively, although the first embodiment illustratively describes the case where the bias current of the magnetic head 22 is controlled for the bias of the magnetic head 22, the bias voltage of the magnetic head 22 may be controlled instead of the bias current of the magnetic head 22.

Second Embodiment

Next, the magnetic disk device according to the second embodiment will be described. Description will be made below focusing on the differences from the first embodiment.

Although in the first embodiment the bias current of the magnetic head 22 is changed in a stepwise manner from the value I1 to the value I2 (<I1), in the second embodiment, the bias current of the magnetic head 22 is changed autonomously from the value I1 to the value I2 (<I1).

Figure 11:
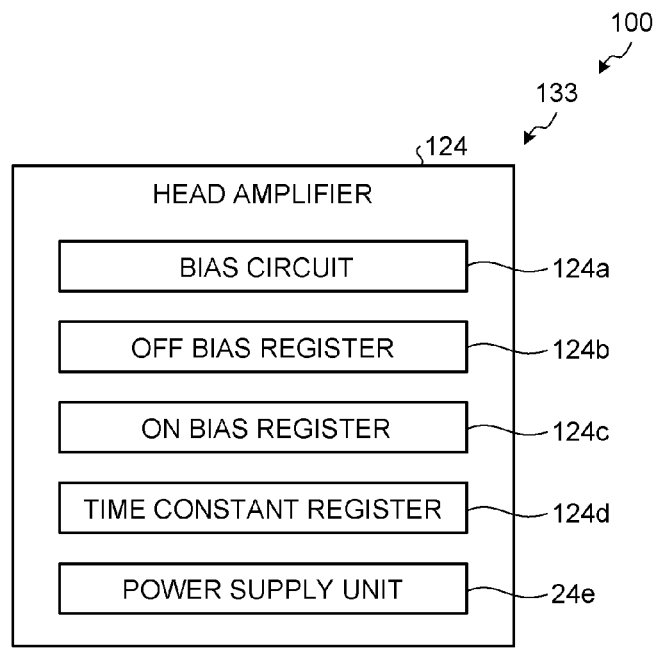
FIG. 11 is a diagram showing configuration of a head amplifier in a second embodiment.

Specifically, the control unit 133 of the magnetic disk device 100 has a head amplifier 124 as shown in FIG. 11 instead of the head amplifier 24 (see FIG. 1). FIG. 11 is a diagram showing the configuration of the head amplifier 124. The head amplifier 124 comprises a circuit having a time constant and in response to the current flow through the heater 204 being turned on, changes the bias current to be generated from the value I1 to the value I2 (<I1) according to the time constant thereof.

That is, the head amplifier 124 has a bias circuit 124*a*, an off bias register (first register) 124*b*, an on bias register (second register) 124*c*, a time constant register (third register) 124*d*, and a power supply unit 24*e*. The off bias register 124*b* holds a control value for the bias current corresponding to the current flow through the heater 204 being off. The on bias register 124*c* holds a control value for the bias current corresponding to the current flow through the heater 204 being on. The time constant register 124*d* holds a control value for the time constant.

The bias circuit 124*a* has the time constant. The bias circuit 124*a*, in response to the current flow through the heater 204 being turned on, generates the bias current while changing the value of the bias current from the control value held in the on bias register 124c to the control value held in the off bias register 124b at the time constant corresponding to the control value held in the time constant register 124d. The bias circuit 124a supplies the generated bias current to the magnetic head 22 (the reproducing head 202).

Figure 12:
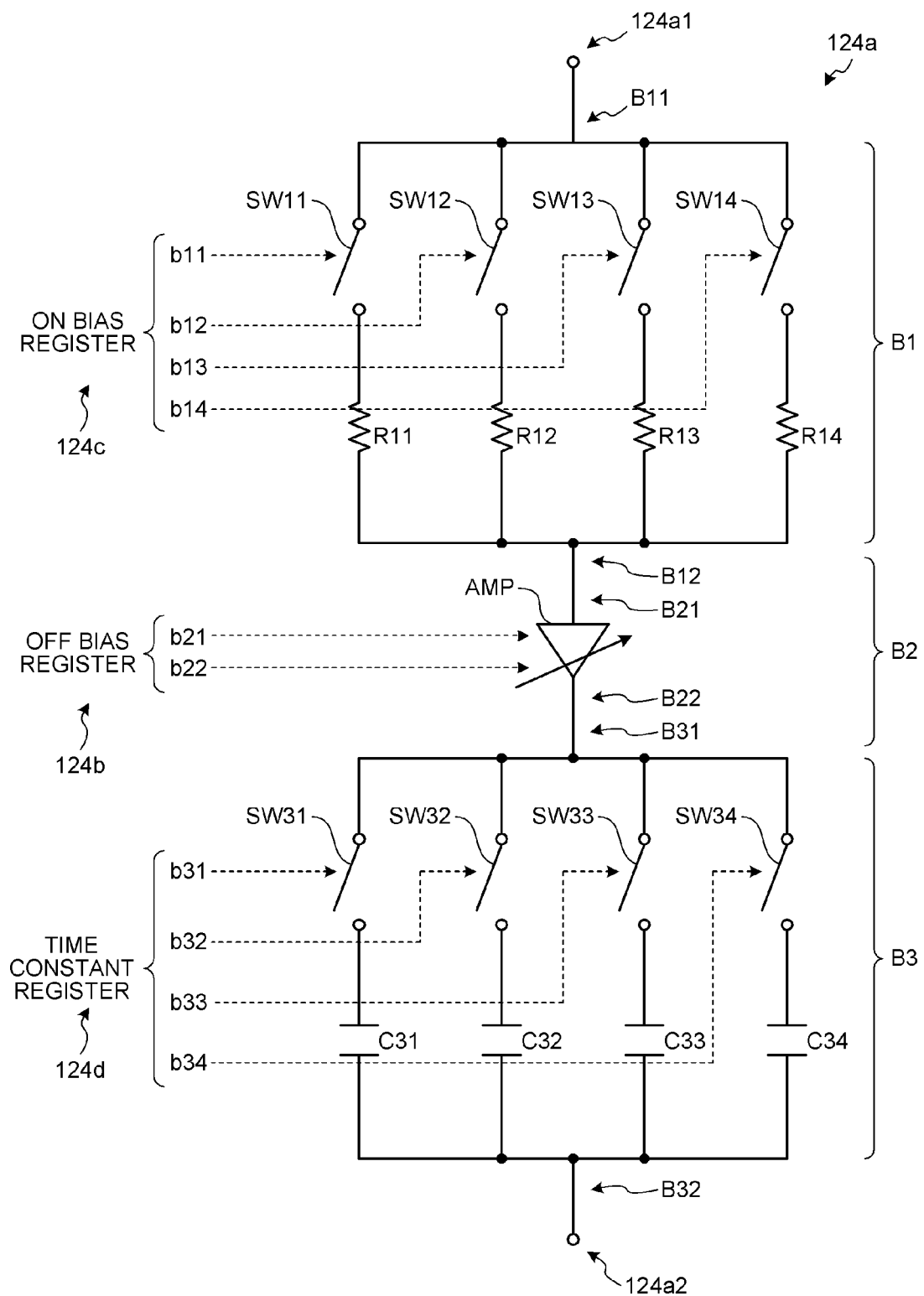
FIG. 12 is a diagram showing configuration of a bias circuit in the second embodiment.

Specifically, the bias circuit 124a has the configuration as shown in FIG. 12. FIG. 12 is a diagram showing the configuration of the bias circuit 124a. In the bias circuit 124a, an on bias setting block B1, an off bias setting block B2, and a time constant setting block B3 are connected serially between an input terminal 124a1 and an output terminal 124a2.

The on bias setting block B1 has multiple switches SW11 to SW14 and multiple resistors R11 to R14. In the on bias setting block B1, some of the resistors R11 to R14 can be connected between an input node B11 and an output node B12 according to the on/off of the switches SW11 to SW14. The multiple switches SW11 to SW14 correspond to the multiple resistors R11 to R14 and correspond to the multiple bits b11 to b14 of the control value of the on bias register 124c.

Each switch SW11 to SW14 can connect the corresponding resistor R11 to R14 between the input node B11 and the output node B12 according to the corresponding bit b11 to b14. The conductance values (reciprocals of the resistances) of the resistors R11 to R14 can be set to satisfy the following expression 4.

$$1/(R11):1/(R12):1/(R13):1/(R14)=\sigma':2a':4a':8a'$$ Expression 4

By setting them to satisfy the expression 4, the combined conductance value of the on bias setting block B1 can be varied by units of conductance value σ' according to the bits b11 to b14, so that on-bias current can be set to vary by units corresponding to the conductance value σ'.

The off bias setting block B2 has a variable gain amplifier AMP. The variable gain amplifier AMP is connected on its input side to an input node B21 and on its output side to an output node B22. The gain of the variable gain amplifier AMP corresponds to the multiple bits b21 to b22 of the control value of the off bias register 124b. By changing the gain of the variable gain amplifier AMP, off-bias current can be set to vary.

The time constant setting block B3 has multiple switches SW31 to SW34 and multiple capacitors C31 to C34. In the time constant setting block B3, some of the capacitors C31 to C34 can be connected between an input node B31 and an output node B32 according to the on/off of the switches SW31 to SW34. The multiple switches SW31 to SW34 correspond to the multiple capacitors C31 to C34 and correspond to the multiple bits b31 to b34 of the control value of the time constant register 124d.

Each switch SW31 to SW34 can connect the corresponding capacitor C31 to C34 between the input node B31 and the output node B32 according to the corresponding bit b31 to b34. When the corresponding bit b31 to b34 is active (e.g., 1), each switch SW31 to SW34 makes the corresponding capacitor C31 to C34 electrically inserted between the input node B31 and the output node B32. When the corresponding bit b31 to b34 is non-active (e.g., 0), each switch SW31 to SW34 makes the corresponding capacitor C31 to C34 electrically separated from between the input node B31 and the output node B32.

The capacitors C31 to C34 can be configured to have different capacitance values respectively. The capacitance values of the capacitors C31 to C34 can be set to satisfy the following expression 5.

$$C31:C32:C33:C34=c:2c:4c:8c$$ Expression 5

By setting them to satisfy the expression 5, the combined capacitance value of the time constant setting block B3 can be varied by units of capacitance value c according to the bits b31 to b34, so that the time constant of the bias circuit 124a can be varied by units corresponding to the capacitance value c.

Figure 13:
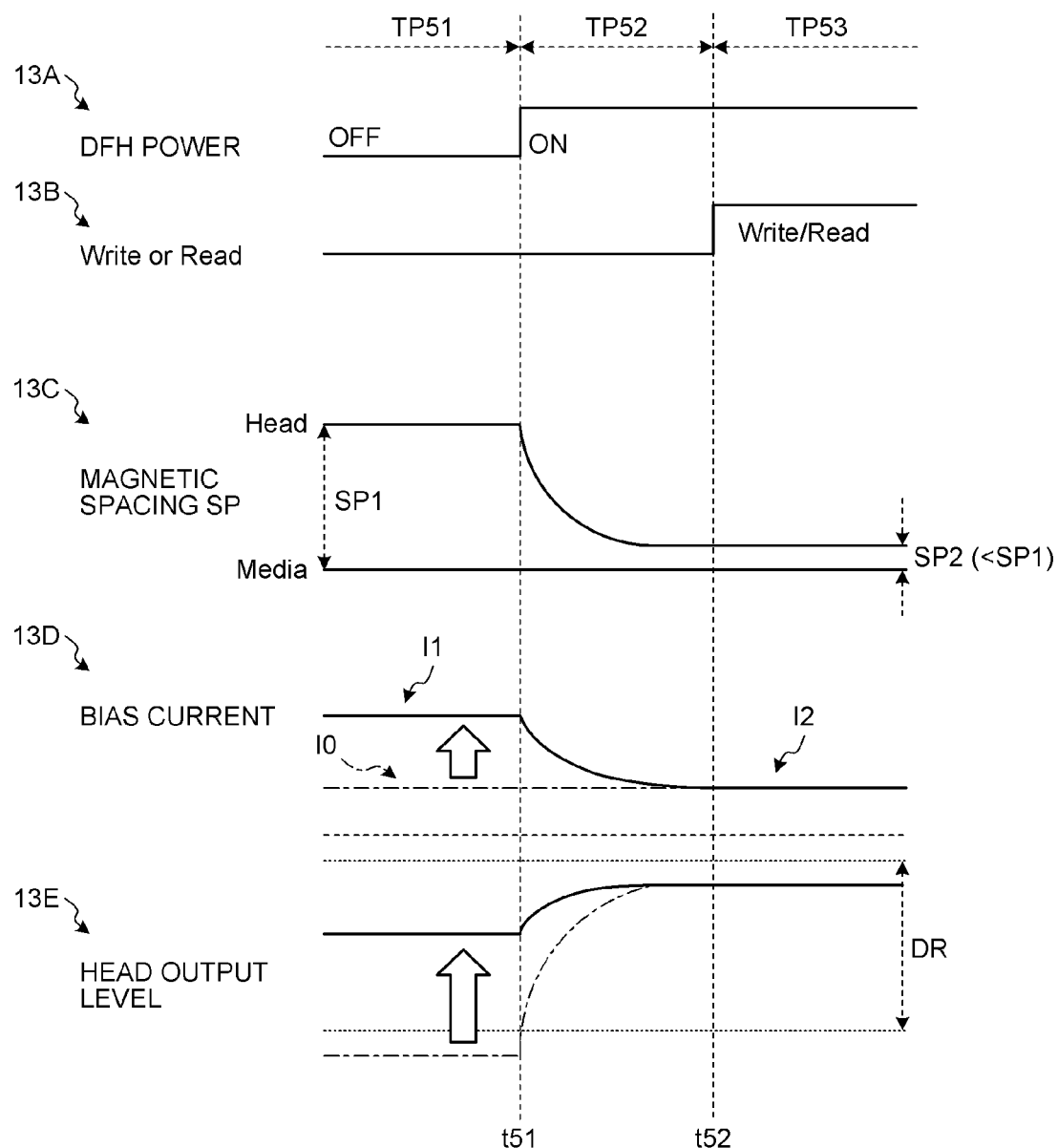
FIG. 13 is a diagram showing control of bias current in the second embodiment.
Figure 14:
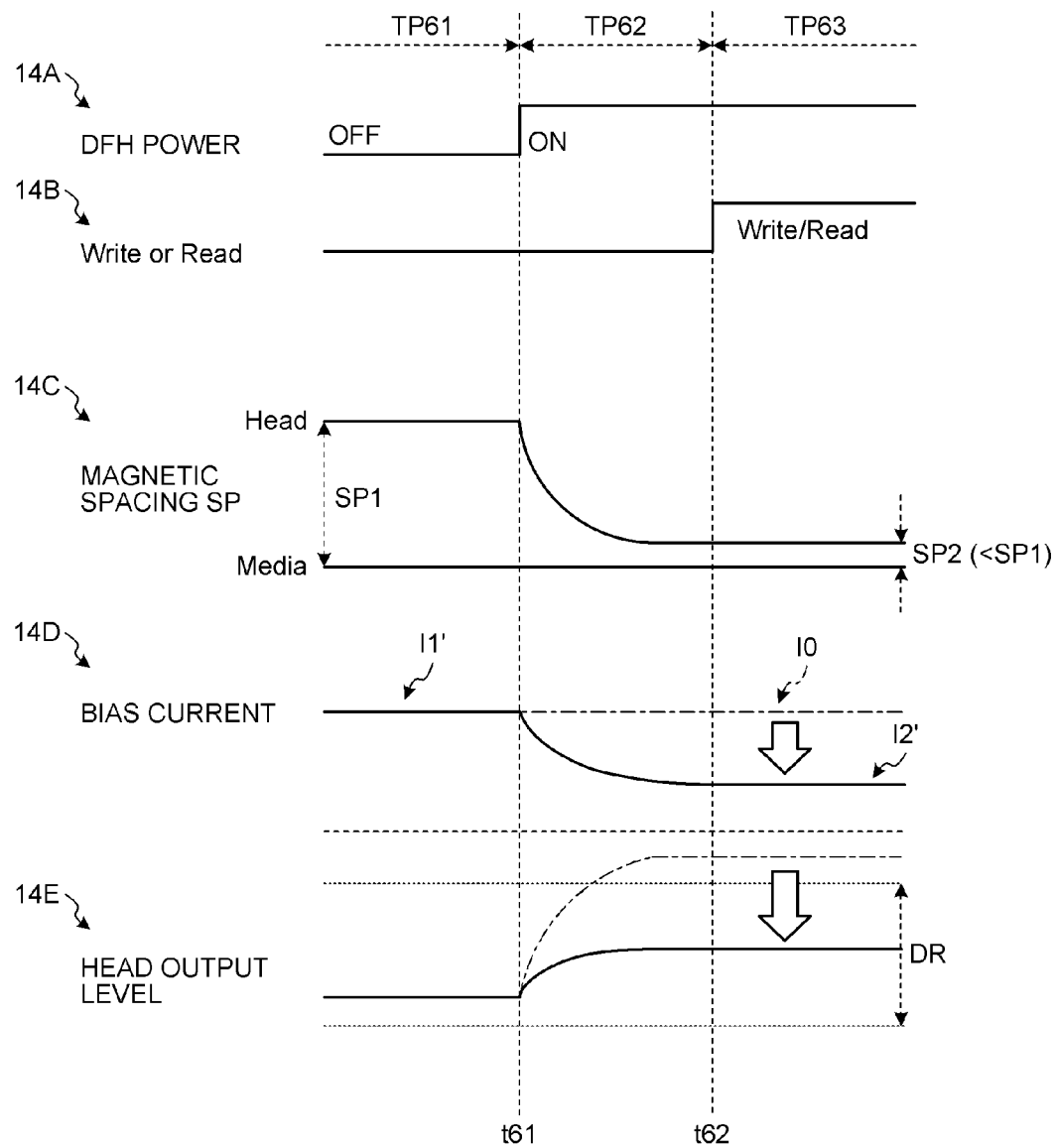
FIG. 14 is a diagram showing control of bias current in the second embodiment.

With this configuration, the head amplifier 124 autonomously changes the bias current of the magnetic head 22 following ON of the DFH control as shown in FIGS. 13 and 14. FIGS. 13 and 14 are diagrams showing the control of the bias current.

For example, where it is understood from an experiment beforehand that if control of the basic form to keep the bias current constant all the time (see 15D of FIG. 15) is performed, the output level of the reproducing head 202 will deviate below from the input dynamic range DR of the AGC circuit 25a (see 15E of FIG. 15), the control unit 133 performs control of the bias current as shown in FIG. 13.

During time period TP51 preceding timing t51, the controller 32 accesses the off bias register 124b beforehand to set the control value corresponding to the value I1 of the bias current in the off bias register 124b. The bias circuit 124a keeps the bias current of the magnetic head 22 at the value I1 according to the control value of the off bias register 124b. The value I1 is adjusted to be at a value greater than the value I2 (≈I0) so that the output level of the magnetic head 22 (the reproducing head 202) is within the input dynamic range DR of the AGC circuit 25a (see 13D of FIG. 13).

At timing t51, the controller 32 accesses the on bias register 124c to set the control value corresponding to the value I2 of the bias current in the on bias register 124c. The controller 32 selects a time constant corresponding to a characteristic close to the change characteristic (see 13C of FIG. 13) of the magnetic spacing SP from among multiple time constants that are candidates to be set. The controller 32 accesses the time constant register 124d to set the control value corresponding to the selected time constant in the time constant register 124d.

Thus, during time period TP52 from timing t51 to timing t52, the head amplifier 124 autonomously changes the bias current of the magnetic head 22 from the value I1 to the value I2 at the time constant set in the time constant register 124d. The value I2 may be substantially equal to the value I0 in the basic form (see 15D of FIG. 15).

During time period TP53 subsequent to timing t52, the head amplifier 124 keeps the bias current of the magnetic head 22 at the value I2.

Or, for example, where it is understood from an experiment beforehand that if control of the basic form to keep the bias current constant all the time (see 15D of FIG. 15) is performed, the output level of the reproducing head 202 will deviate above from the input dynamic range DR of the AGC circuit 25a (see 15F of FIG. 15), the control unit 133 performs control of the bias current as shown in FIG. 14.

During time period TP61 preceding timing t61, the bias circuit 124a keeps the bias current of the magnetic head 22 at the value I1' according to the control value of the off bias register 124b. The value I1' may be substantially equal to the value I0 in the basic form (see 15D of FIG. 15).

At timing t61, the controller 32 accesses the on bias register 124c to set the control value corresponding to the value I2' of the bias current in the on bias register 124c. The controller 32 selects a time constant corresponding to a characteristic close to the change characteristic (see 14C of FIG. 14) of the magnetic spacing SP from among multiple time constants that are candidates to be set. The controller 32 accesses the time constant register 124*d* to set the control value corresponding to the selected time constant in the time constant register 124*d*.

Thus, during time period TP62 from timing t61 to timing t62, the head amplifier 124 autonomously changes the bias current of the magnetic head 22 from the value I1' to the value I2' at the time constant set in the time constant register 124*d*. During time period TP63 subsequent to timing t62, the control unit 33 keeps the bias current of the magnetic head 22 at the value I2'. The value I2' is adjusted to be at a value smaller than the value I1' so that the output level of the magnetic head 22 (the reproducing head 202) is within the input dynamic range DR of the AGC circuit 25*a* (see 14D of FIG. 14).

As described above, in the second embodiment, the head amplifier 124 in the control unit 133 of the magnetic disk device 100 generates the bias current to supply to the magnetic head 22 while autonomously changing the value of the bias current according to the setting of current flow through the heater 204. Specifically, the head amplifier 124 comprises a circuit having a time constant and, in response to the current flow through the heater 204 being turned on, changes the bias current to be generated from the value I1 to the value I2 according to the time constant thereof. By this means, the change characteristic of the bias current can be made further close to the change characteristic of the magnetic spacing SP, and thus the output level of the magnetic head 22 (the reproducing head 202) can be changed smoothly as shown in 13E of FIGS. 13 and 14E of FIG. 14. As a result, the AGC control by the AGC circuit 25*a* can be caused to further easily follow the output of the magnetic head 22, and thus the amplitude of the signal after AGC can be stably kept at amplitude AM1, resulting in the AGC control by the AGC circuit 25*a* being further stabilized.

Further, in the second embodiment, the bias circuit 124*a* in the head amplifier 124, in response to the current flow through the heater 204 being turned on, generates the bias current while changing the value of the bias current from the value corresponding to the control value held in the on bias register 124*c* to the value corresponding to the control value held in the off bias register 124*b* at the time constant corresponding to the control value held in the time constant register 124*d*. By this means, the bias circuit 124*a* can autonomously change the bias current without the need for the controller 32 (CPU 26) to rewrite the control values of the registers sequentially, and thus the control contents of the controller 32 can be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head that reads out information recorded on the magnetic disk;
   a heater configured to adjust a magnetic spacing of the magnetic head from the magnetic disk; and
   a control unit configured to change a bias amount of the magnetic head according to setting of current flow through the heater, wherein the control unit comprises:
   a head amplifier comprising a register configured to hold a control value for the bias amount and a bias circuit configured to generate a bias according to the control value held in the register and to supply generated bias to the magnetic head; and
   a controller configured to set the control value of the register to a first control value correspondingly to off state of the current flow through the heater and to set the control value of the register to a second control value corresponding to a smaller bias value than a bias value corresponding to the first control value correspondingly to on state of the current flow through the heater.

2. The magnetic disk device according to claim 1, wherein the control unit, in response to the current flow through the heater being turned on, changes the bias amount of the magnetic head so that output level of the magnetic head is within a particular range.

3. The magnetic disk device according to claim 1, wherein the control unit, in response to the current flow through the heater being turned on, changes the bias amount of the magnetic head from a first value to a second value smaller than the first value.

4. The magnetic disk device according to claim 3, wherein the control unit, in response to the current flow through the heater being turned on, changes the bias amount of the magnetic head in a stepwise manner from the first value to the second value.

5. The magnetic disk device according to claim 3, wherein the control unit, in response to the current flow through the heater being turned on, changes the bias amount of the magnetic head in a stepwise manner by a gradually decreasing variation amount from the first value to the second value.

6. The magnetic disk device according to claim 1, wherein the controller, in response to the current flow through the heater being turned on, sets the control value of the register so as to change in a stepwise manner from the first control value to the second control value.

7. The magnetic disk device according to claim 1, wherein the controller sets the control value of the register so as to change in a stepwise manner from the first control value to the second control value at timings between multiple servo timings which pass during time from when the current flow through the heater is turned on until the magnetic spacing of the magnetic head becomes stable.

8. A magnetic disk device comprising:
   a magnetic disk;
   a magnetic head that reads out information recorded on the magnetic disk;
   a heater configured to adjust a magnetic spacing of the magnetic head from the magnetic disk; and
   a control unit including a head amplifier configured to generate a bias to supply to the magnetic head while autonomously changing the value of the bias amount according to the setting of the current flow through the heater,
   the head amplifier comprising:
   a first register configured to hold a control value for the bias amount corresponding to off state of the current flow through the heater;
   a second register configured to hold a control value for the bias amount corresponding to on state of the current flow through the heater;
   a third register configured to hold a control value for the time constant; and a bias circuit configured to generate a bias, in response to the current flow through the heater being turned on, while changing the bias amount from a value corresponding to the control value held in the first register to a value corresponding to the control value held in the second register with a time constant corresponding to the control value held in the third register.

9. A head amplifier for a magnetic disk device that comprises a heater configured to adjust a magnetic spacing of a magnetic head configured to read out information recorded on the magnetic disk from a magnetic disk,
the head amplifier generating a bias to supply to the magnetic head while autonomously changing value of a bias amount according to setting of current flow through the heater,
the head amplifier comprising:
a first register configured to hold a control value for the bias amount corresponding to off state of the current flow through the heater;
a second register configured to hold a control value for the bias amount corresponding to on state of the current flow through the heater;
a third register configured to hold a control value for the time constant; and
a bias circuit configured to generate a bias, in response to the current flow through the heater being turned on, while changing the bias amount from the first value corresponding to the control value held in the first register to the second value corresponding to the control value held in the second register with a time constant corresponding to the control value held in the third register.

10. The magnetic disk device according to claim 8, wherein the control unit, in response to the current flow through the heater being turned on, changes the bias amount of the magnetic head so that output level of the magnetic head is within a particular range.

11. The magnetic disk device according to claim 8, wherein the control unit, in response to the current flow through the heater being turned on, changes the bias amount of the magnetic head from a first value to a second value smaller than the first value.

12. The magnetic disk device according to claim 11, wherein the control unit, in response to the current flow through the heater being turned on, changes the bias amount of the magnetic head in a stepwise manner from the first value to the second value.

13. The magnetic disk device according to claim 11, wherein the control unit, in response to the current flow through the heater being turned on, changes the bias amount of the magnetic head in a stepwise manner by a gradually decreasing variation amount from the first value to the second value.

* * * * *